J. M. HEWITT.
FRICTION CLUTCH.
APPLICATION FILED JULY 15, 1913.
1,143,908.
Patented June 22, 1915.
2 SHEETS—SHEET 1.
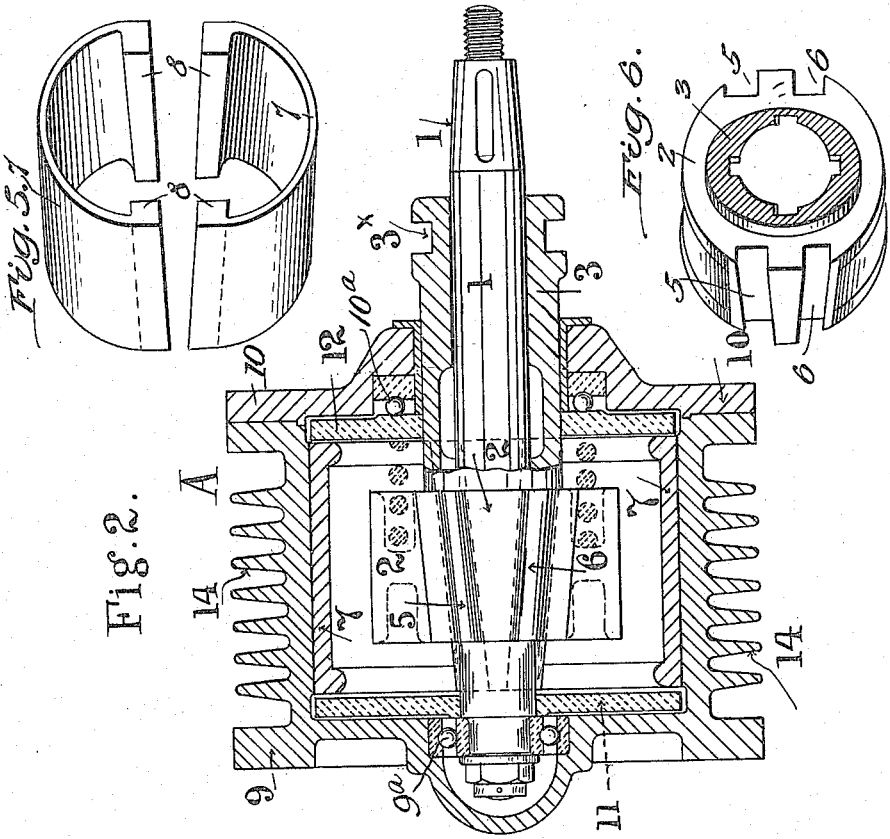
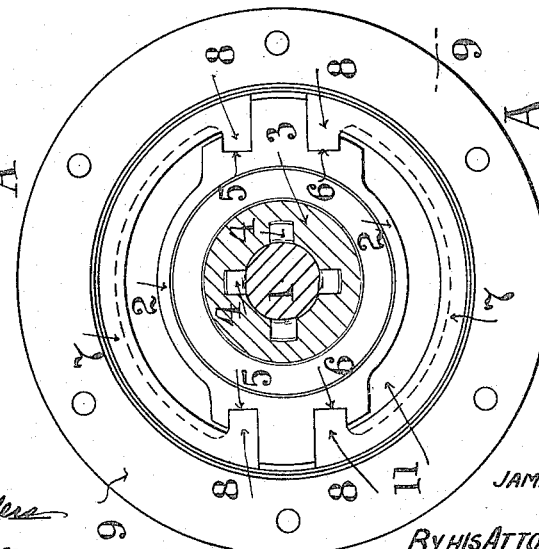
WITNESSES
John C. Sanders
Albert F. Newman
INVENTOR
JAMES MITCHELL HEWITT
BY HIS ATTORNEY J. M. HEWITT.
FRICTION CLUTCH.
APPLICATION FILED JULY 15, 1913.
1,143,908.
Patented June 22, 1915.
2 SHEETS—SHEET 2.
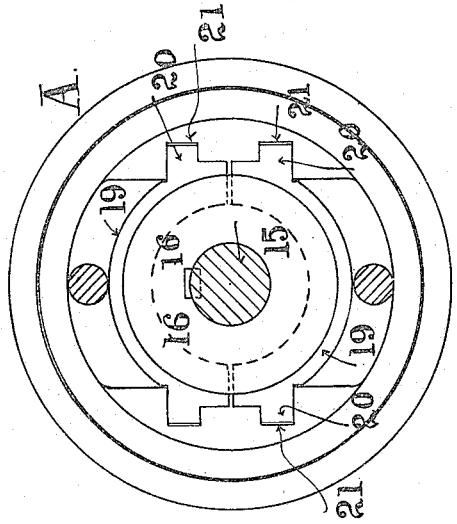
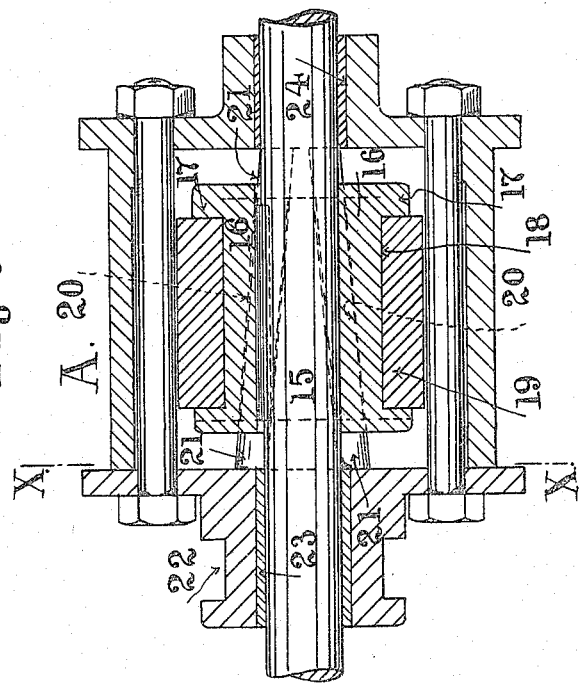
WITNESSES
John C Sanders
Albert F Heuman
INVENTOR
JAMES MITCHELL HEWITT
BY HIS ATTORNEY

UNITED STATES PATENT OFFICE.

JAMES MITCHELL HEWITT, OF HALE, ENGLAND.

FRICTION-CLUTCH.

1,143,908.   Specification of Letters Patent.   Patented June 22, 1915.

Application filed July 15, 1913.  Serial No. 779,076.

*To all whom it may concern:*

Be it known that I, JAMES MITCHELL HEWITT, a subject of the King of Great Britain and Ireland, residing at Norwood, Cambridge Road, Hale, in the county of Chester, England, consulting engineer, have invented new and useful Improvements in or Relating to Friction-Clutches, of which the following is a specification.

This invention relates to friction clutches, and has reference to a form of clutch or coupling which is at once exceedingly compact, simple and self-contained and adapted to retain lubricant.

It embodies in its construction the known wedging or expansion or jamming principle, simple end movement of a part or of the inclosing casing or other device, or relative movement effecting clutching or unclutching of the elements. This wedging, expansion, or jamming system is made use of by me in the improved types of clutch to be described, wherein all the elements are contained within an inclosed cylindrical container. The elements of this container do not move relatively one to another but the container masks half-sleeves or binders which are separated or contracted to effect clutching and this without relative movement of the elements of the cylindrical casing and without depending in any way (for a clutching effect) on end thrust.

The improved constructions which embody the features of my invention are hereafter fully described and shown in the drawings.

In the said drawings: Figure 1 is an end elevation, shown partly in section, of a form of clutch in accordance with the invention, the cover plate and bearing being omitted. Fig. 2 is a longitudinal, vertical section of the clutch as shown in Fig. 1, the barrel being partly in elevation and partly in section. Fig. 3 illustrates in sectional elevation a modified form of clutch according to my invention. Fig. 4 shows an end elevation with the end cover removed. Fig. 5 is a detail perspective view of the half-sleeves or shoes of the device as shown in Fig. 1. Fig. 6 is a similar view of the barrel, as shown in Fig. 1, with the sleeve mounted therein, the latter being partly in section.

Referring in the first place to the construction shown by Figs. 1 and 2. In this combination, I mount upon the driving shaft 1 a suitable boss or barrel 2 and this is formed with or attached to a sleeve 3 capable of sliding on said shaft 1. The sleeve 3 is fashioned to engage keys 4 on the shaft 1; or other provision is made for a sliding and driving connection between the boss or barrel 2 and the shaft 1. Respecting the exterior of the boss or barrel 2, this is machined or cut with grooves or channel ways as for example two grooves or channel ways 5 and 6 upon each side, as shown, or four grooves or channel ways in all. The grooves or channels 5, 6 as to each pair are slightly inclined the one to the other. Fitting over the boss or barrel 2 I apply two half sleeves or expanders 7, 7 with inclined and inturned edges 8, 8 which engage the grooves or channel ways 5, 6 and so ride on and cling to the boss or barrel 2 as shown. Obviously, under end movement of the half sleeves or expanders or the boss or barrel, the former move slightly from or toward the center of the driving shaft according to the particular direction of movement. This movement is utilized to effect clutching or unclutching as desired. I prefer to move the boss or barrel 2 by actuating the sleeve 3 in any known or convenient manner.

Surrounding the boss or barrel 2 and the half sleeves or expanders 7, 7 I fit a cylindrical clutch casing A which is made in two or more parts such as 9, 10 and which parts are bored to receive bushes or bearings $9^a$ and $10^a$ as shown. Ball or roller bearings may be fitted, the application of the former being clearly indicated at Fig. 2. A clutch casing so constructed can thus rest on the shaft and sleeve 3 and bears in two places and entirely envelops the clutching devices. I preferably apply end rings or washers 11, 12 to separate the boss or barrel and the half sleeves or expanders from the inner end walls of the cylindrical casing A. While the end of the clutch actuating sleeve 3 is shown turned with a collar or groove $3^x$, for the starting gear to engage with to work the clutch, it is to be distinctly understood that the boss or barrel may be otherwise worked.

The inclosing casing A is well adapted to be filled with lubricant so that the entire parts may work in grease.

I arrange to take power from the driven casing in any approved manner, as for example the clutch casing may be bolted to the fly-wheel in the case of a clutch for automobiles. Obviously by slight modification the casing may be the driver and the shaft the driven part.

The clutch casing A may be provided with heat dissipating fins 14 in case of considerable slipping taking place.

In the modified construction shown by Figs. 3 and 4, I fix upon the driving shaft 15 a boss or barrel 16 turned with end collars 17 and an annular recess 18, and, I lay in the annular recess two half sleeves or binding elements 19, 19 having oppositely inclined and outwardly projecting edges, as for example two such edges 20, 20 to each half sleeve or binding element 19. In this case, the inner wall of the cylindrical clutch casing A would be cut with two sets of two grooves or channels 21, 21, correspondingly inclined. Thus, as the cylindrical clutch casing A is moved in one direction or the other, the half sleeves or binding elements 19, 19 effect clutching or unclutching.

The cylindrical clutch casing is shown with a turned groove or collar 22 for the actuating gear and is bushed at 23, 24 where the shaft 15 passes through; and, the said casing A is adapted to receive and retain lubricant. In this case, the clutch casing is moved to effect clutching and unclutching, but, the casing might be held and the shaft moved; or slight movement of both may be arranged for. In the Figs. 3 and 4, power is or may be taken from the clutch casing periphery. Obviously in this case the clutch casing may be driven.

In order to hold the clutch "in" or "out" I may use any convenient retaining device.

I declare that what I claim is:

1. An incased friction clutch comprising two movable half sleeves, inclined projections thereon extending in the length of the sleeves, a movable device combining therewith, inclined grooves in said movable device engaging the inclined projections, movement of the movable device actuating the half sleeves as described.

2. An incased friction clutch comprising a cylindrical casing, a removable cover for the casing, two half sleeves within the casing, inclined projections on the two half sleeves, inclined recesses in which said projections engage, relative movement between projections and inclines moving inward and outward the half sleeves to effect clutching or un-clutching as described.

3. An incased friction clutch having a casing, a cover therefor, two half sleeves within the casing, inclined projections longitudinally of the two half sleeves, an actuator, inclined recesses therein in which said projections engage, means to move said actuator to move inward and outward the two half sleeves to bind on or release the casing as described.

In testimony whereof I have signed my name to this specification in the presence of two subscribing witnesses.

JAMES MITCHELL HEWITT.

Witnesses:
 RICHARD WEBSTER IBBERSON,
 ALFRED STUART YATES.

Copies of this patent may be obtained for five cents each, by addressing the "Commissioner of Patents. Washington, D. C."